United States Patent
Kawasaki et al.

(10) Patent No.: US 7,039,779 B2
(45) Date of Patent: May 2, 2006

(54) ACCESS MONITOR AND ACCESS MONITORING METHOD FOR MONITORING ACCESS BETWEEN PROGRAMS

(75) Inventors: Yusuke Kawasaki, Kawasaki (JP); Shigeru Hashimoto, Kawasaki (JP); Koken Yamamoto, Kawasaki (JP); Tomomi Shiobara, Kawasaki (JP); Ryoichi Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 611 days.

(21) Appl. No.: 09/739,885

(22) Filed: Dec. 20, 2000

(65) Prior Publication Data
US 2001/0021966 A1 Sep. 13, 2001

(30) Foreign Application Priority Data
Mar. 10, 2000 (JP) ............................. 2000-066885
Jun. 29, 2000 (JP) ............................. 2000-196621

(51) Int. Cl.
*G06F 12/14* (2006.01)
(52) U.S. Cl. ...................... 711/163; 711/152; 710/22
(58) Field of Classification Search ................ 711/152, 711/163; 710/22
See application file for complete search history.

(56) References Cited

U.S. PATENT DOCUMENTS

| | | | |
|---|---|---|---|
| 3,803,559 A | 4/1974 | Bandoo et al. .......... 340/172.5 |
| 4,442,484 A | 4/1984 | Childs, Jr. et al. .......... 364/200 |
| 4,519,032 A * | 5/1985 | Mendell ...................... 711/173 |
| 4,729,094 A * | 3/1988 | Zolnowsky et al. .......... 712/34 |
| 4,890,223 A * | 12/1989 | Cruess et al. ................ 711/207 |
| 4,985,825 A * | 1/1991 | Webb et al. ................. 711/169 |
| 5,452,431 A | 9/1995 | Bournas ..................... 395/442 |
| 5,557,771 A * | 9/1996 | Kawaguchi et al. ........ 711/163 |
| 5,600,818 A | 2/1997 | Weikmann .................. 395/490 |
| 5,848,435 A * | 12/1998 | Brant et al. ................. 711/152 |
| 5,890,189 A * | 3/1999 | Nozue et al. ................ 711/100 |
| 5,987,557 A | 11/1999 | Ebrahim ..................... 710/200 |
| 6,151,618 A * | 11/2000 | Wahbe et al. ................... 709/1 |

* cited by examiner

*Primary Examiner*—Reginald G. Bragdon
(74) *Attorney, Agent, or Firm*—Armstrong, Kratz, Quintos, Hanson, & Brooks, LLP.

(57) ABSTRACT

An access violation of the program is monitored by the access monitor which is a hardware. The access monitor acquires a signal input from the CPU to a memory. The access monitor includes an access permission table as information of the memory region to be permitted to each program, and detects the access violation of the signal from the CPU by referring thereto. In this manner, the unjust access is monitored by the hardware, thereby preventing the unjust access by rewriting in software.

6 Claims, 6 Drawing Sheets

| No. | Name | |
|---|---|---|
| 0 | APNo. 0 | ·a number for OS, application manager, driver, handler, etc.<br>·Having no restriction to access to memory |
| 1~15 | APNo. 1~15 | ·Numbers for applications having restriction to access to memory<br>·Forbidden to access to device directly<br>·Needed device request to OS to access | though it

ACCESS MONITOR AND ACCESS MONITORING METHOD FOR MONITORING ACCESS BETWEEN PROGRAMS

BACKGROUND OF THE INVENTION

1. Field of the Invention

The present invention relates generally to security of an apparatus having a central processing unit (CPU) for executing a plurality of programs, and more particularly, to an access monitor for monitoring an unjust access between the programs in the apparatus, and an access monitoring method.

2. Description of the Related Arts

In recent years, as an electronic commerce, etc. spreads, an electronic dealing apparatus such as an electronic money terminal, an ATM (Automatic Teller Machine), or the like high in security is acquired. The electronic dealing apparatus installs a plurality of programs such as OS (Operating System), applications, various drivers, and the like, and an built-in CPU executes them. At this time, in order to secure the security of each application, it is necessary that the plurality of applications memorized in a RAM built in the apparatus are isolated from each other. The isolation of the applications is to prevent an unjust access to a memory region of another application in the RAM by execution of a certain application.

FIG. 5 is a configuration diagram of a program installed in an apparatus. In FIG. 5, respective programs such as applications A, B, . . . , drivers A, B, C, . . . , or the like are managed by the OS.

FIG. 6 is a typical diagram of program execution conditions. The plurality of programs to be executed are memorized in a memory (RAM) in the apparatus. The CPU accesses to a memory region corresponding to the program to be executed, and reads out the program to be executed. However, in the prior art, as each program is isolated in software, readout of another program is possible by execution of a certain program by rewriting of the certain program (arrow of a waved line in FIG. 6).

More specifically, as each program operates only one program time-divisionally, it is impossible to completely control operation of a program such as applications, or the like by the OS. Accordingly, when a programmer looks at a memory region of another program intentionally, when the programmer rewrites the program, or a runaway of the executing program occurs, it is possible that an improper or unjust access is readily made to a memory region of another program.

In this manner, in a conventional apparatus, in the case where security information (for example, a password, etc.) is memorized in a memory region by executing a program, an access can be made from the other programs to the memory region, and there is a problem that, if the program is isolated only in software, an absolute isolation between programs is not ensured.

Furthermore, even if a certain program is installed in the apparatus, and the operation is confirmed, when another program is installed therein thereafter, it is impossible to ensure whether to affect the original program, or whether or not the original program operates correctly. Accordingly, after another program is installed therein, operational verification of the original program had to be remade from the beginning.

SUMMARY OF THE INVENTION

It is therefore an object of the present invention to provide an access monitor for monitoring an unjust access between programs in an apparatus installing a plurality of programs, and an access monitoring method.

In order to attain the above objects, according to the present invention, an access violation of the program is monitored by the access monitor which is hardware. The access monitor acquires a signal input from the CPU to a memory. The access monitor includes an access permission table as information of the memory region to be permitted to each program, and detects the access violation of the signal from the CPU by referring thereto. In this manner, the improper or unjust access is monitored by the hardware, thereby preventing the unjust access by rewriting in software.

The access monitor according to the present invention for attaining the aforesaid objects is, for example, one for monitoring an access between programs in an apparatus including a CPU and a memory storing each of the plurality of programs to be executed thereby. The access monitor comprises a table for storing access permission information including information concerning a region of the memory, with each program being permitted to access the region of the memory; and a detector for acquiring a signal output from the CPU to the memory and for detecting an unjust or improper access of a program executed by the CPU by monitoring the address included in the signal from the CPU based on the access permission information corresponding to the program executed by the CPU, the access permission information being established by a predetermined managing program in advance.

Preferably, when the detector detects the unjust access, the detector causes the CPU to implement an interruption (the detector causes the interruption to occur) and the CPU executes an interruption processing through the managing program.

Furthermore, the access monitor comprises a data storing unit, wherein, when the detector detects the unjust or improper access, the detector writes information corresponding to the unjust or improper access into the data storing unit, and the CPU executes the interruption processing corresponding to information written into the data storing unit.

Furthermore, preferably, the program to be executed by the CPU writes an end of such program into the data storing unit, and when the detector detects that the end of the program is written into the data storing unit, the detector causes the CPU an interruption.

Furthermore, the detector switches the established access permission information to the access permission information corresponding to the managing program when the interruption occurs in the CPU.

The managing program can access to all regions of the memory, and further the managing program is stored in the memory with rewriting disabled, and the other programs other than the managing program can access a storage region of the managing program.

Furthermore, preferably, the access permission information has the information concerning read and/or write permission corresponding to the region of the memory, and when the detector detects the unjust access, the detector cuts off a read signal and/or a write signal to be output from the CPU to the memory based on the access permission information.

Furthermore, preferably, the access permission information has information concerning permission of instruction execution and/or data access corresponding to the region of the memory, and when the detector detects an unjust or improper access, the detector cut off an instruction signal and/or data access signal to be output from the CPU to the memory based on the access permission information.

The access monitoring method for attaining the aforesaid objects is, for example, one for monitoring an access between programs in an apparatus including a CPU and a memory storing each of the plurality of programs to be executed thereby. The access monitoring method comprises the steps of: preparing access permission information including information concerning a region of the memory, with each program being permitted to access the region of the memory; establishing, by a predetermined managing program, the access permission information corresponding to the program to be executed by the CPU; acquiring an access signal to be output from the CPU to the memory; and detecting the unjust or improper access of the program to be executed by the CPU by monitoring the region of the memory corresponding to the access signal from the CPU based on the established access permission information.

DESCRIPTION OF THE PREFERRED EMBODIMENTS

Hereinafter, an embodiment of the present invention will be explained. However, a technical scope of the present invention is not limited to this embodiment.

Figure 1:
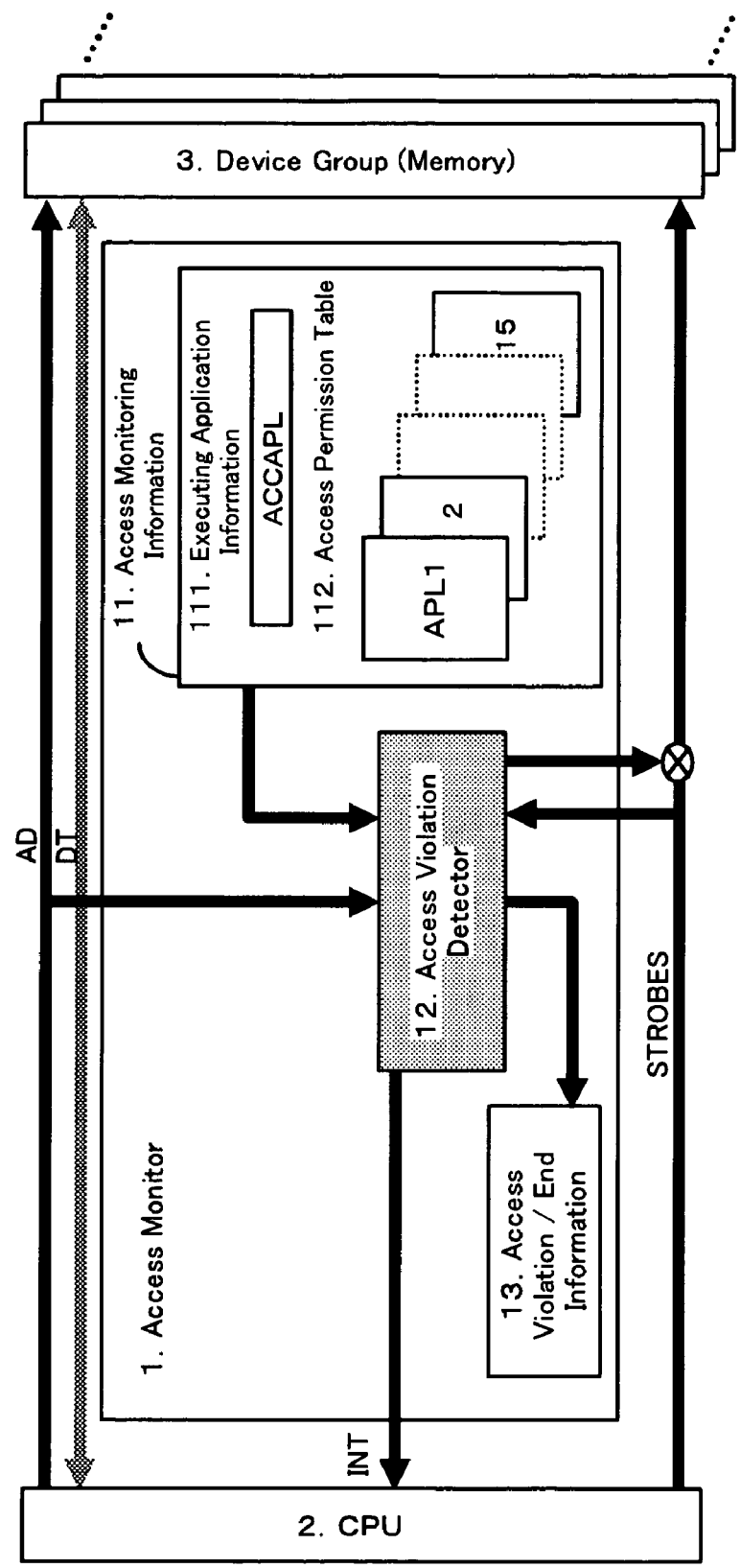
FIG. 1 shows a configuration of a monitor according to an embodiment of the present invention.

FIG. 1 is a configuration diagram of an access monitor according to the embodiment of the present invention. According to the present invention, an unjust access to another program memorized in a memory region by execution of a certain program is detected by hardware, namely an access monitor 1 in FIG. 1, thereby ensuring absolutely an isolation between the respective programs.

In FIG. 1, a CPU 2 outputs various signals (an address signal AD, a data signal DT, a strobe signal (a read signal, a write signal, an instruction signal, a data access signal, or the like), STROBES, or the like) to a device group 3 which is accessed by a CPU 2 such as an inner memory, a register, an external device, or the like (hereinafter representatively referred to as a memory). The access monitor 1 monitors a signal output from the CPU 2.

The access monitor 1 contains access monitoring information 11, an access violation detector 12, and access violation/end information 13. The access monitoring information 11 and access violation/end information 13 are stored in a register built in the access monitor 1, for example. Furthermore, the access monitoring information 11 contains presently executing application information 111, and an information table of an access permission region (hereinafter referred to as an access permission table) 112. The presently executing application information 111 contains an identification number for identifying each program, as described later. The access permission table 112 contains information of the access permission region corresponding to each application. The access violation detector 12 is constituted by a comparator or the like, and as described below, a signal to be output from the CPU 2 (an address signal, a strobe signal, or the like) is monitored based on the access monitoring information 11.

Furthermore, when the access violation detector 12 detects an end of each program, or an access violation, access violation information and program end information are written into the register (data storing unit) as the access violation/end information 13, and also an interruption (INT) is sent to the CPU 2.

Figures 2A, 2B:
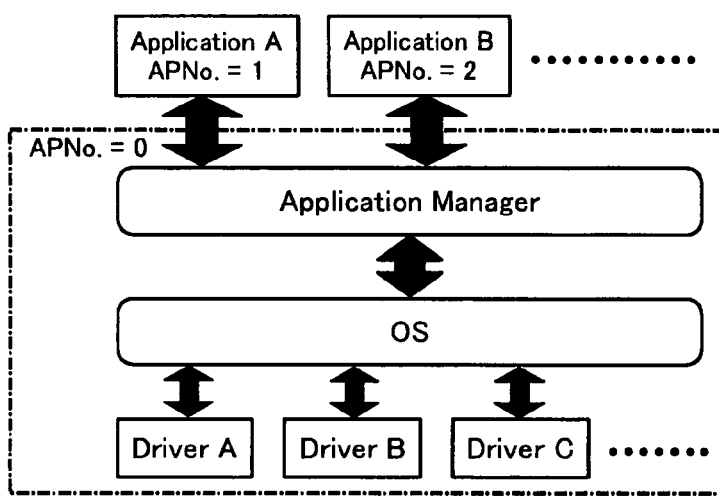
FIGS. 2A and 2B are diagrams for explaining a configuration of a program installed in a monitor according to the embodiment of the present invention.

FIGS. 2A and 2B are diagrams for explaining a configuration of a program installed in the access monitor according to the embodiment of the present invention. In FIG. 2A, the monitor 1 according to the embodiment of the present invention further installs an application manager (managing program) as a program for managing the access monitoring information (the presently executing application information 111 and access permission table 112) 11, and the access violation/end information 13. Furthermore, the application manager manages a start and end of each application.

Furthermore, according to the embodiment of the present invention, an identifier of each program is allocated to each program. For example, in the case where numbers of "0" to "15" (identification numbers) are allocated as the identifier, the identification number is defined as shown in FIG. 2B. Namely, OS, the application manager, a driver, a handler, etc. are allocated to the identification number "0". The identification number "0" is a special number, and in the program of the identification number "0", an access to all the regions in the inner memory 3 is permitted. Accordingly, in the above access permission table 112, the table corresponding to the identification number "0" is not necessary.

Furthermore, separate application is allocated to the identification numbers "1" to "15" excluding the identification number "0." In the application of the identification numbers "1" to "15," an access is permitted only to the region of the inner memory 3 specified by the access permission table 112. In the case where the program of the identification numbers "1" to "15" accesses to the region not specified by the access permission table 112, the access violation detector 2 detects the access violation.

Figure 3:
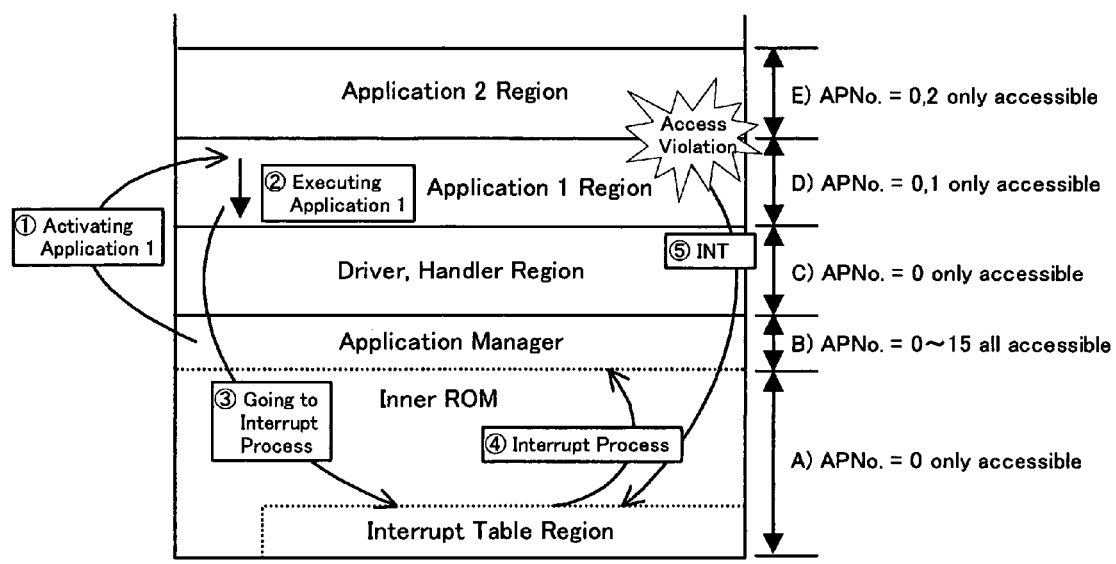
FIG. 3 is a diagram for explaining a region of an inner memory according to the embodiment of the present invention.

FIG. 3 is a diagram for explaining a region of an inner memory according to the embodiment of the present invention. In regions A to E shown in FIG. 3, the region A is a region to which the program of the identification number "0" can access, and the OS, etc. is memorized. The region B is a region to which all the applications of the identification numbers "1" to "15" can access, and the application manager is memorized. In the case where the programs of the identification numbers "1" to "15" are activated, as described below, the application manager rewrites the presently executing application information 111 of the access monitoring information 11 from the identification number "0" to an identification number of the application to be activated. At this time, as this rewriting is performed prior to transfer of a processing to the application to be 5 activated, such inconveniences are caused that the rewriting is performed, and simultaneously the processing by the application manager of the identification number "0" is detected as the access violation.

In order to dissolve these inconveniences, according to the embodiment of the present invention, as shown in FIG. 3, the application manager is stored in the region B where the programs of all the identification numbers are accessible. Namely, a rewriting routine of the identification number is effected in the region where all programs are accessible. Accordingly, the respective access permission tables 112 corresponding to the application of the identification numbers "1" to "15" have address information of the region B as well as the region (for example, regions D, E of FIG. 3) corresponding to each application. Furthermore, since it is prevented that the application manager is unjustly rewritten, the application manager is written into an inner ROM which has rewrite permission disabled.

The region C is, for example, a use region of a driver, a handler, etc., and the program of the identification number "0" is accessible. Furthermore, the regions D, E are use regions of applications 1, 2, respectively, and the programs of the respective identification numbers and the identification number "0" are accessible.

Figure 4:
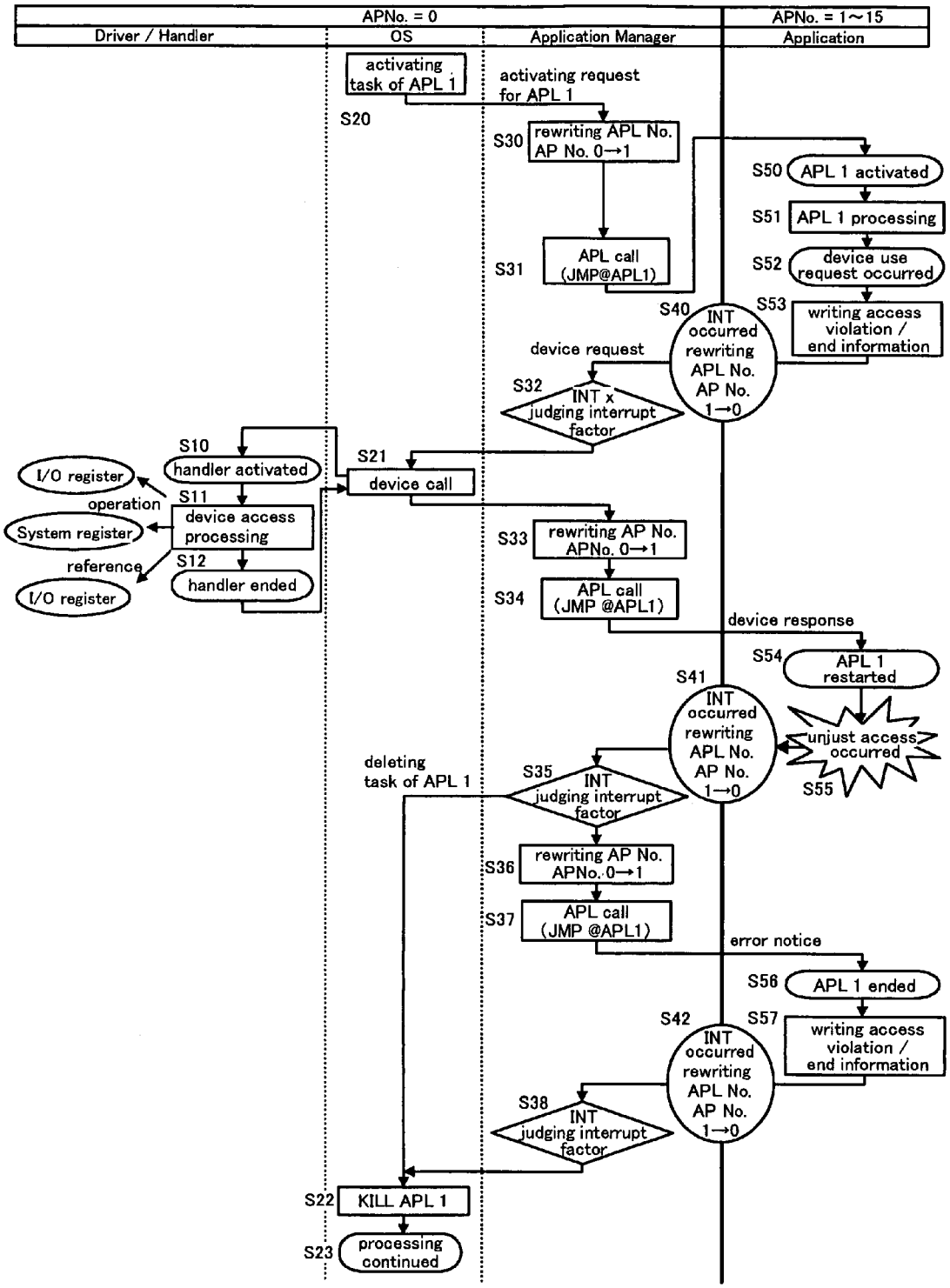
FIG. 4 is a diagram showing a flowchart of an access control processing according to the embodiment of the present invention.
Figure 5:
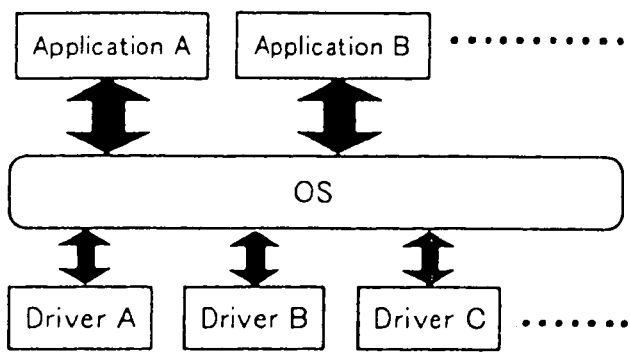
FIG. 5 shows a configuration of a conventional program installed in an apparatus.
Figure 6:
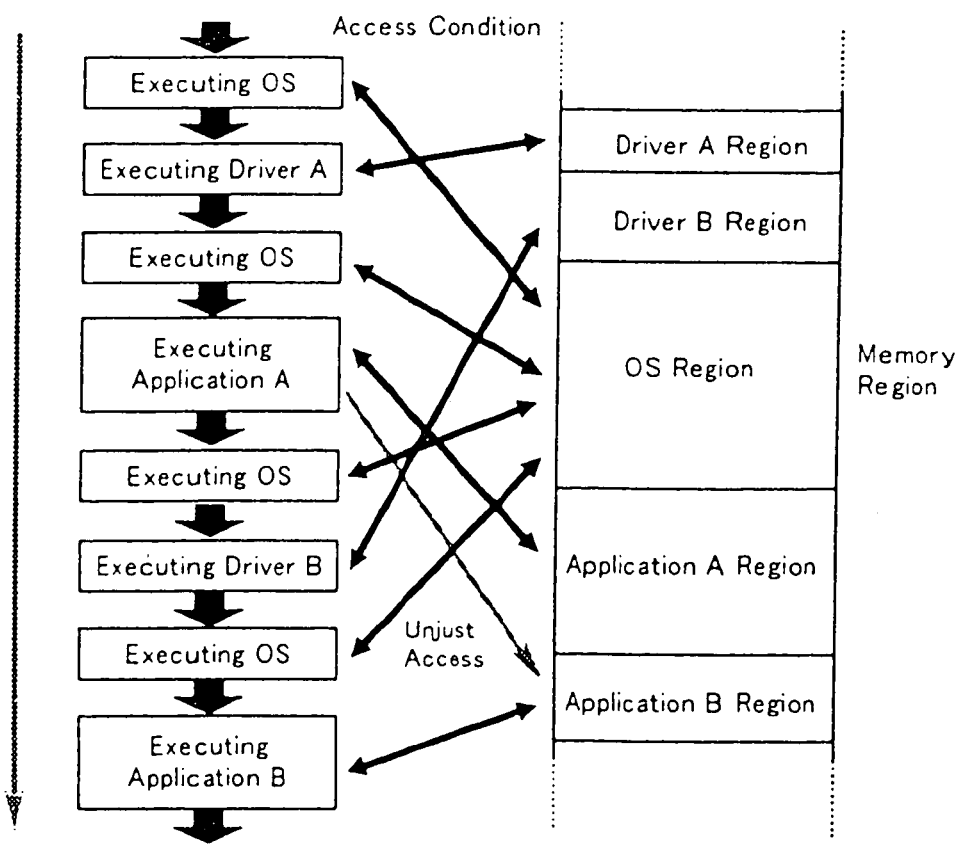
FIG. 6 is a typical diagram of program execution conditions.

FIG. 4 is a diagram showing a flowchart of an access control processing according to the embodiment of the present invention. In FIG. 4, for example, a start and end of the application of the identification number "1" (hereinafter merely referred to as application 1) will be explained.

In the case where the application 1 is activated, first, an "activation request for the application 1" is issued from the OS to the application manager (S20). Then, the application manager rewrites the presently executing application information 111 of the access monitoring information 11 from the identification number "0" to "1" (S30). Thus, the access violation detector 12 selects the access permission table 112 corresponding to the application 1, and monitors various access signals from the CPU 2. When the application manager rewrites the presently executing application information 111, it calls out the application 1 (S31).

The application 1 is activated (S50) (arrow ① of FIG. 3), and a processing of the application 1 is executed (S51). The execution of the application 1 is shown by arrow ② of FIG. 3. During the processing of the application 1, for example, when a use demand of the device occurs (S52), an interruption processing starts as explained next. The interruption processing is not limited to the use demand of the device, but is executed even by an end of application in the case where the end of application 1 is desired.

In the case where the interruption processing is executed by the use demand of the device or application end, the application 1 writes interruption information into the access violation/end information 13 of the monitor 1 (S53). The interruption information contains an interruption factor (device use demand/application end, access violation, or the like). The access violation detector 12 also always monitors the access violation/end information 13. When the access violation detector 12 detects that the interruption information is written, it causes an interruption (INT) for the CPU 2, it further rewrites the presently executing application information 111 of the access monitoring information 11 from the identification number "1" to "0" (S40). When the interruption occurs, the CPU 2 executes an interruption routine of an interruption table region in the region A of FIG. 3 (arrow ③ of FIG. 3), and transfers the processing to the application manager (arrow ④ of FIG. 3).

The application manager analyzes the interruption information in the access violation/end information 13, and judges the interruption factor (S32). In the case where the interruption factor is a use demand of the device, the application manager transfers the processing to the OS, the OS calls out the device (device call) (S21). Then, for example, the handler corresponding to the device activates (S10), and the access processing to the device is executed (S11). Thereafter, when the handler is ended (S12), the processing is again transferred to the application manager by way of the OS. The application manager rewrites the presently executing application information 111 from the identification number "0" to "1" in the same manner as in steps S30 and S31, and calls out the application 1 (S34). Thus, the processing of the application 1 restarts (S54).

When the access signal to the memory region which is not permitted by the access permission table 112 corresponding to the application 1 is output during the processing of the application 1, the access violation detector 12 detects an access violation (unjust or improper access) (S55). When the access violation detector 12 detects the access violation, it writes an access violation factor into the access violation/end information 13 as the interruption information, and also causes the interruption (INT) for the CPU 2. Incidentally, the access violation detector 12 includes an access control table in which a plurality of access violation factors are established, and determines the access violation factor corresponding to the access violation detected with reference thereto.

Furthermore, the access violation detector 12 causes the interruption, and also similar to step S40, it rewrites the presently executing application information 111 of the access monitoring information 11 from the identification number "1" to "0" (S41). Similar to the above, when the interruption occurs, the CPU 2 executes the interruption routine of the interruption table region in the region A of FIG. 3 (arrow ⑤ of FIG. 3), and transfers the processing to the application manager (arrow ④ of FIG. 3).

The application manager analyzes the access violation factor in the access violation/end information 13, and judges the interruption factor (S35). Corresponding to the type of access violation factor, the different processing may be established. For example, the application manager again rewrites the presently executing application information 111 from the identification number "0" to "1" (S36), and calls out the application 1 (S37). At this time, the application manager notifies the application 1 of an error. Thus, the application 1 is ended (S56). At this time, the application 1 writes the interruption information corresponding to the application end into the access violation/end information 13 of the monitor 1 (S57). When the access violation detector 12 detects that the interruption information is written, it causes the interruption (INT) for the CPU 2, and further rewrites the presently executing application information 111 of the access monitoring information 11 from the identification number "1" to "0" (S42). When the interruption occurs, in the same manner as above, the application manager analyzes the interruption factor (S38), and in the case where the interruption factor is an application end, as the application has already been ended, the processing returns to the OS (S23).

Incidentally, the application is not ended during the application 1 corresponding to the interruption factor judged at step S35, but a processing of deleting a task of the application may be performed (KILL processing) (S22).

In this manner, according to the embodiment of the present invention, the access monitor 1 monitors the access violation of the program in a hardware manner. The access monitor 1 includes an access permission table as the information of the memory region permitted in each program, and detects the access violation with reference thereto. Accordingly, it is possible to prevent the unjust or improper access by rewriting of the program, etc.

Furthermore, as the application manager for controlling the access permission table in each program writes into the inner ROM, the rewriting of the application manager is impossible. Accordingly, the unjust or improper access by the rewriting of the access permission table is prevented, and it is realized that the unjust or improper access between the programs is absolutely ensured.

The program establishing the access permission table is limited to the access to the inner memory, etc. by the access permission table. When an improper access is attempted, the improper access violating the access permission table, the interruption automatically occurs in the CPU 2 due to the access monitor 1 as hardware. The processing of the CPU 2 is compulsorily transferred to the processing corresponding to the access violation by the application manager.

On the other hand, the program establishing the access permission table utilizes the interruption for both the end and device use demand (device request). As described above, at the times of the device use demand and program end, predetermined information is written to the register 13 of the access monitor 1, so that the access monitor 1 causes the CPU 2 to implement the interruption. By this interruption processing, the device use demand processing and program end processing by the application manager are executed. This is because, since a change of the presently executing program is recognized to the access monitor 1, it is necessary that the identification number in the presently executing program information 111 in the access monitor 1 is changed by the application manager.

Furthermore, the region of the register for storing the access monitoring information 11 or access violation/end information 13 is designed to be a region only accessed by the program of the identification number "0" (in particular, application manager). This is because it is important to prevent the application having another identification number from rewriting unjustly or improperly its own identification number.

Furthermore, according to the present invention, as shown in FIG. 1, the access monitor 1 monitors an address signal from the CPU 2 as well as a strobe signal (a read signal, a write signal, an instruction signal, a data access signal, etc.). Access conditions as well as the access permission region are established in the access permission table. The access conditions are, for example, a read enable/disable and a write enable/disable with respect to the predetermined memory region, the read and write being both the enable/disable. Furthermore, the access conditions are an enable/disable of an instruction execution and an enable/disable of a data access with respect to the predetermined memory region, and the instruction execution and data access are both the enable/disable.

In the case where the access monitor 1 violates the access conditions of the access permission table 112, a gate 4 of a strobe line may be closed, thereby preventing the unjust or improper access. In this manner, the strobe line is cut off physically, and the strobe signal does not reach the inner memory 3, so that it is possible to prevent the unjust or improper access. Incidentally, in this case, it is not necessary that the access monitor 1 causes the CPU 2 to implement the interruption. However, this access monitor 1 may cause the CPU to implement the interruption.

Furthermore, according to the above embodiment, the driver, handler, or the like is established as the same identification number "0" with the application manager, and OS, but a number excluding the identification number "0" may be imparted in the same manner as in the application. However, as the direct operation by the application is not permitted, a different number from the application is imparted. Furthermore, the identification numbers of the application manager and OS are not required to be "0", but have only to differ from the identification number of the application.

(Another Embodiment)

Next, another embodiment of the present invention will be explained. According to this embodiment, a processing in the case where the application occurs a DMA (Direct Memory Access) demand will be explained. The device (memory, etc.) enables a high-speed data transfer not via the CPU by the DMA transfer. Namely, as the DMA transfer is made outside control of the CPU, in the DMA transfer, a signal from the CPU to the device is not output, and the access monitor according to the present invention cannot monitor the unjust or improper access in the DMA transfer. According to this embodiment, in the case of the DMA transfer, the unjust or improper access is monitored by a DMA control handler (control program) set to be an application level 0.

Figure 7:
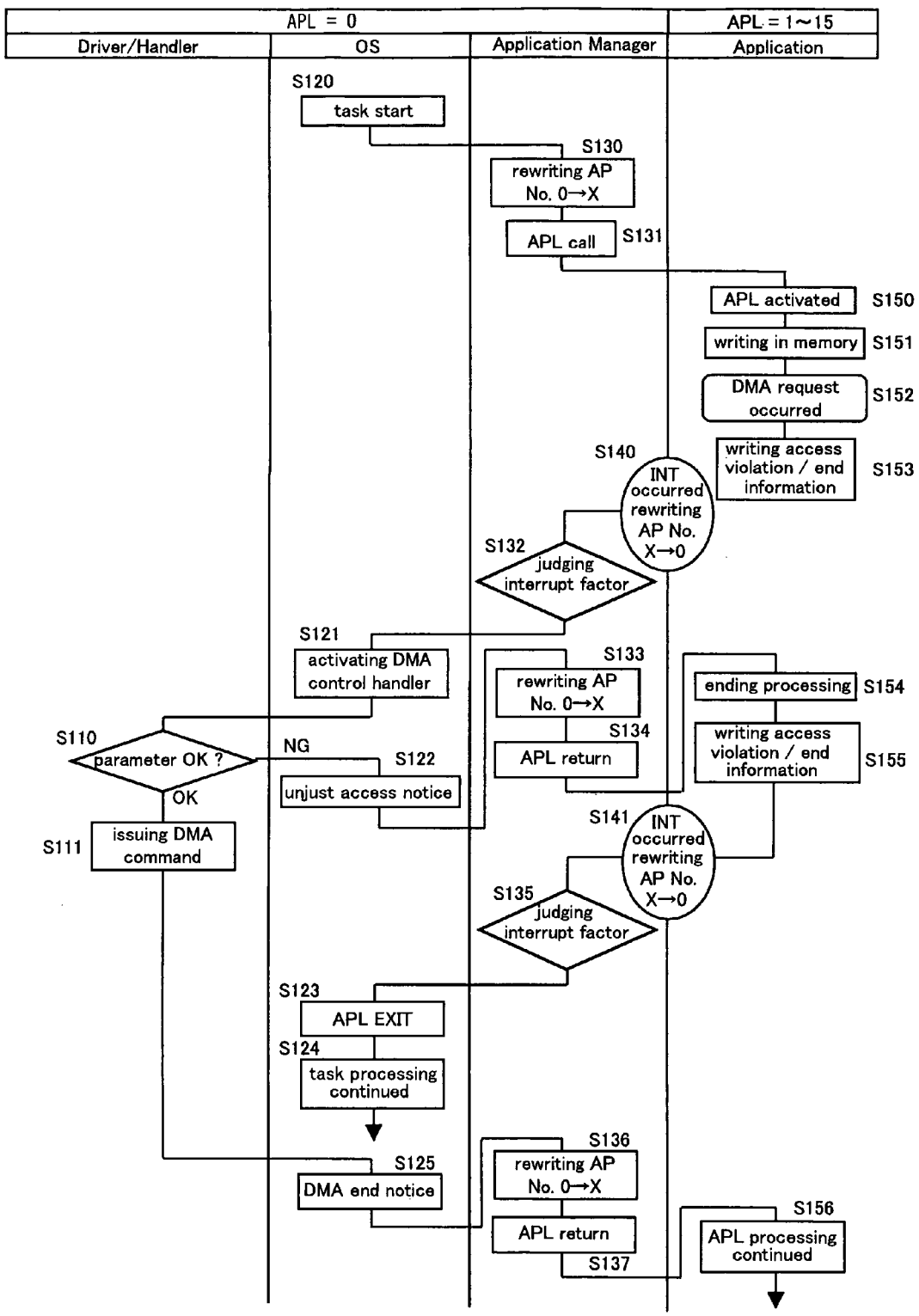
FIG. 7 is a flowchart of the access control processing according to another embodiment of the present invention.

FIG. 7 shows a flowchart of an access control processing according to another embodiment of the present invention. In FIG. 7, a start and end of the application of an identification number "X (X=1 to 15)" (hereinafter referred to as merely application X) will be explained.

In the case where the application X is activated, first, a "start request for application X" from the OS to the application manager is issued (S120). Then, the application manager rewrites the presently executing application information 111 of the access monitoring information 11 from the identification number "0" to "X" (S130). Thus, the access violation detector 12 selects the access permission table 112 corresponding to the application X, and monitors various access signals from the CPU 2. After the application manager rewrites the presently executing application information 111, it calls out the application X (S131).

The application X is activated (S150), and during the processing of the application X, for example, data writing is effected into the access permission region of the application 1 of the memory 3 (S151), and when the DMA demand of the data is occurred (S152), and the interruption processing described in FIG. 4 starts.

That is, the application X writes into the access violation/end information 13 of the monitor 1 with a DMA request system call corresponding to the DMA demand as the interruption information (S153). The DMA request system call has parameters such as a transferor heading address, a transferee heading address, transfer data ranges, and the like. When the access violation detector 12 detects that the interruption information is written, it causes the interruption (INT) to the CPU 2, and further, rewrites the presently executing application information 111 of the access monitoring information 11 from the identification number "X" to "0" (S140). When the interruption occurs, as described above, the CPU 2 transfers the processing to the application manager.

The application manager analyzes the interruption information in the access violation/end information 13, and judges the interruption factor (S132). According to this embodiment, as the interruption factor is a DMA demand, the application manager transfers the processing to the OS, and the OS activates the DMA control handler (S121). The activated DMA control handler refers to the access permission table 112 of the access violation monitor 1, and judges the unjust access in the parameters included in the DMA request system call (S110). Specifically, in the parameters included in the DMA request system call, it is judged whether or not (1) the memory region up to the transferor heading address to such heading address+the transfer data ranges is a read permission region of the application X, and further whether or not (2) the memory region up to the transferor heading address to such heading address+the transfer data ranges is a write permission region of the application X.

When the DMA control handler judges an access as being unjust or improper, the OS receives an unjust access notice (S122), and further, the OS transfers the unjust access notice to the application manager, and transfers the processing to the application manager.

The application manager rewrites the presently executing application information 111 from the identification number "0" to "X" (S133), and calls out the application X again (S134). At this time, the application manager notifies the application X of an error. Thus, the application X performs an end processing (S154). At this time, the application X writes an EXIT request system call corresponding to the application end into the access violation/end information 13 of the monitor 1, as the interruption information (S155). When the access violation detector 12 detects that the interruption information is written, it causes the interruption (INT) to the CPU 2, and further, rewrites the presently executing application information 111 of the access monitoring information 11 from the identification number "X" to "0" (S141). When the interruption occurs, as described above, the application manager analyzes the interruption factor (S135). According to this embodiment, as the interruption factor is an application end, the OS performs the application EXIT processing (S123), and transfers to a next task processing (S124).

On the other hand, at step S110, in the case where the access is unjust or improper, the DMA control handler issues a DMA instruction (S111), and executes the DMA transfer. When the DMA transfer is ended, the OS receives a DMA completion notice (S125). Furthermore, the OS transfers the DMA completion notice to the application manager, and transfers the processing to the application manager.

The application manager rewrites the presently executing application information 111 from the identification number "0" to "X" (S136), and calls out the application X again (S137). Thus, the processing of the application X is continued (S156).

In this manner, in the case where the DMA demand occurs in the application, the DMA control handler checks the access region with respect to the DMA demand of the activating application, and detects the unjust or improper access.

Hereinabove, according to the present invention, in the apparatus including the CPU and the plurality of programs to be executed thereby, it is possible to prevent the unjust or improper access between the programs, so that security of the apparatus is enhanced.

The scope of protection of the present invention is not limited to the above embodiments but covers also the invention defined by the appended claims and its equivalents.

What is claimed is:

1. An access monitor for monitoring an access between programs in an apparatus including a CPU and a memory memorizing a plurality of programs to be executed by a CPU, the access monitoring comprising:
   a table for storing access permission information including information concerning a region of the memory, with each program being permitted to access in each program;
   a data storing unit; and
   a detector for acquiring a signal output from the CPU to the memory and for detecting an access violation of a program executed by the CPU by monitoring the address included in the signal from the CPU based on the access permission information corresponding to the program executed by the CPU, the access permission information being established by a predetermined managing program in advance, wherein the access monitor is spaced apart from the CPU, and wherein
   when the detector detects the access violation, the detector writes information corresponding to the access violation into the data storing unit and causes an interruption to occur, and the CPU executes an interruption processing of the managing program using the information written into the data storing unit to prevent unjust access of the program wherein the program executed by the CPU writes an end of such program into the data storing unit, and when the detector detects that the end of the program is written into the data storing unit, the detector causes the interruption.

2. The access monitor according to claim 1, wherein the detector switches the established access permission information to access permission information corresponding to the managing program when the interruption occurs.

3. The access monitor according to claim 1, wherein the managing program is able to access to all regions of the memory.

4. The access monitor according to claim 1, wherein the managing program is stored in the memory with rewriting permission disabled, and the other programs other than the managing program can access a storage region of the managing program.

5. The access monitoring according to claim 1, wherein the access permission information has information concerning read and/or write permission corresponding to the region of the memory, and when the detector detects the access violation, the detector cuts off a read signal and/or a write signal output from the CPU to the memory based on the access permission information.

6. The access monitoring according to claim 1, wherein the access permission information has information concerning permission of instruction execution and/or data access corresponding to the region of the memory, and when the detector detects an access violation, the detector cuts off an instruction signal and/or data access signal output from the CPU to the memory based on the access permission information.

* * * * *